United States Patent
Sako (10) Patent No.: US 7,436,959 B2
(45) Date of Patent: Oct. 14, 2008

(54) DATA RECORDING APPARATUS AND RECORDING METHOD

(75) Inventor: Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 10/473,812

(22) PCT Filed: Feb. 5, 2003

(86) PCT No.: PCT/JP03/01191

§ 371 (c)(1),
(2), (4) Date: Oct. 2, 2003

(87) PCT Pub. No.: WO03/067590

PCT Pub. Date: Aug. 14, 2003

(65) Prior Publication Data

US 2004/0131183 A1    Jul. 8, 2004

(30) Foreign Application Priority Data

Feb. 5, 2002    (JP)    ............... 2002-028648

(51) Int. Cl.
H04N 7/167 (2006.01)
H04L 9/00 (2006.01)
H04K 1/00 (2006.01)
G06F 11/30 (2006.01)
G06F 12/14 (2006.01)
H04L 9/32 (2006.01)

(52) U.S. Cl. ............... 380/201; 713/158; 713/176; 713/194

(58) Field of Classification Search ............ 380/201; 713/158, 176, 194
See application file for complete search history.

(56) References Cited

U.S. PATENT DOCUMENTS

| 2002/0021805 A1* | 2/2002 | Schumann et al. ........... 380/201 |
| 2003/0076955 A1* | 4/2003 | Alve et al. ................... 380/201 |
| 2003/0081777 A1* | 5/2003 | Brondijk et al. ............. 380/201 |
| 2004/0131183 A1 | 7/2004 | Sako |

FOREIGN PATENT DOCUMENTS

JP    11-275516    10/1999

(Continued)

OTHER PUBLICATIONS

U.S. Appl. No. 11/677,974, filed Feb. 22, 2007, Sako et al.

*Primary Examiner*—Ayaz Sheikh
*Assistant Examiner*—Shin-Hon Chen
(74) *Attorney, Agent, or Firm*—Oblon, Spivak, McClelland, Maier & Neustadt, P.C.

(57) ABSTRACT

A data recording and/or reproducing device is provided having a deciphering circuit, a detection circuit, a data processing unit, a recording unit and a controller. The deciphering processing unit deciphers and/or decompresses input encrypted and/or compressed data. The detection circuit detects whether or not watermark signals are contained in output data of the deciphering processing unit. The data processing unit is supplied at least with output signals from the deciphering processing unit and applies signal processing for recording on the supplied data. The recording unit records output data from the data processing unit on a recording medium. If the watermark signals are detected to be contained by the detection unit, the controller controls the operation of the data processing unit based on the detected watermark signals.

30 Claims, 6 Drawing Sheets

| | FOREIGN PATENT DOCUMENTS | | |
|---|---|---|---|
| JP | 2000-090569 | 3/2000 | |
| JP | 2000-90569 | 3/2000 | |
| JP | 2000-123480 | 4/2000 | |
| JP | 2000-197012 | 7/2000 | |
| JP | 2000-201269 | 7/2000 | |
| JP | 2000-244726 | 9/2000 | |
| JP | 2000-339851 | 12/2000 | |
| JP | 2001-084694 | 3/2001 | |
| JP | 2001-84694 | 3/2001 | |
| JP | 2001-145055 | 5/2001 | |
| WO | WO 03/067590 A1 | 8/2003 | |

* cited by examiner

CONTINUATION OF FIG.5
DATA RECORDING APPARATUS AND RECORDING METHOD

TECHNICAL FIELD

This invention relates to a data recording apparatus and a data recording method, by means of which data the copyright etc. of which is managed using a watermark signal may be recorded efficiently on a recording medium.

This application claims priority of Japanese Patent Application No. 2002-028648, filed on Feb. 5, 2002, the entirety of which is incorporated by reference herein.

BACKGROUND ART

There are occasions where copyright management data is embedded in contents data such as music motion pictures or game software, in order to limit illicit copying of the contents data. For example, the SDMI (Secure Digital Music Initiative), installed for developing a unified system for the globally usable copyright protection technique, is now investigating into embedding copyright management data in musical air data with watermark signals, with a view to developing a security technique capable of providing music to the consumers in such a manner as to protect the copyright of the music currently in circulation.

For example, the watermark signals are copyright management data, such as copying permitting data or data specifying the number of times of possible copying for the contents data. When recording the contents data into which these watermark signals have been embedded and which have been encrypted and compressed, a data recording device first deciphers the contents data, decompresses the compressed contents data and subsequently extracts the watermark signals from the contents data. If the extracted watermark signals allow for recording, the data recording device re-compresses the decompressed contents data and encrypts the compressed contents data to record the data on a recording medium.

In recording encrypted and compressed contents data by the above method, the cipher of contents data is deciphered and compressed contents data are decompressed. Watermark signals are then detected. After detecting the watermark signals, contents data are re-compressed and re-encrypted, after which the encrypted compressed contents data are recorded on the recording medium. That is, the above-described method is extremely inefficient because of overlapped processing operations, such as re-encryption or re-compression, before recording the contents data on the recording medium.

With this method, in which signal conversion processing, such as re-compression, is involved, the contents data for recording is deteriorated in sound or picture quality. Specifically, the compression processing performs irreversible processing, such as DCT (discrete cosine transform) or quantization. By repetition of the compression processing, data deterioration occurs to a visually or audibly perceptible level.

DISCLOSURE OF THE INVENTION

It is therefore an object of the present invention to provide a data recording method and a data recording apparatus by means of which it is possible to overcome the problems inherent in the so far proposed means for recording data, the copyright of which is supervised as described above, on a recording medium.

It is another object of the present invention to provide a data recording method and a data recording apparatus by means of which data for recording, such as contents data, may be efficiently recorded, without re-encryption or re-compression, as the data for recording, such as contents data, is kept under copyright management.

It is yet another object of the present invention to provide a data recording method and a data recording apparatus by means of which data for recording can be recorded on the recording medium, without data deterioration, by having the signal conversion processing not being involved until the data for recording is recorded on the recording medium.

The present invention provides a data recording device comprising a deciphering processing unit for deciphering and/or decompressing input encrypted and/or compressed data by way of deciphering processing, a detection unit for detecting whether or not watermark signals are included in output data of the deciphering processing, a data processing unit supplied at least with data from the deciphering processing for applying signal processing for recording to the supplied data, a recording unit for recording output data from the processing unit on a recording medium, and a controller for controlling the operation of the data processing unit when the detection unit detects that the watermark signals are included, based on the so detected watermark signals.

The present invention also provides a data recording method comprising deciphering and/or decompressing input encrypted and/or compressed data by way of deciphering processing, detecting whether or not watermark signals are included in output data of the deciphering processing, and changing over the processing operation of recording the input encrypted and/or compressed data on a recording medium, based on the watermark signals, when such watermark signals have been detected.

Other objects, features and advantages of the present invention will become more apparent from reading the embodiments of the present invention as shown in the drawings.

BEST MODE FOR CARRYING OUT THE INVENTION

Referring to the drawings, a data recording device according to the present invention and a data recording method employing this data recording device are explained in detail.

Figure 1:
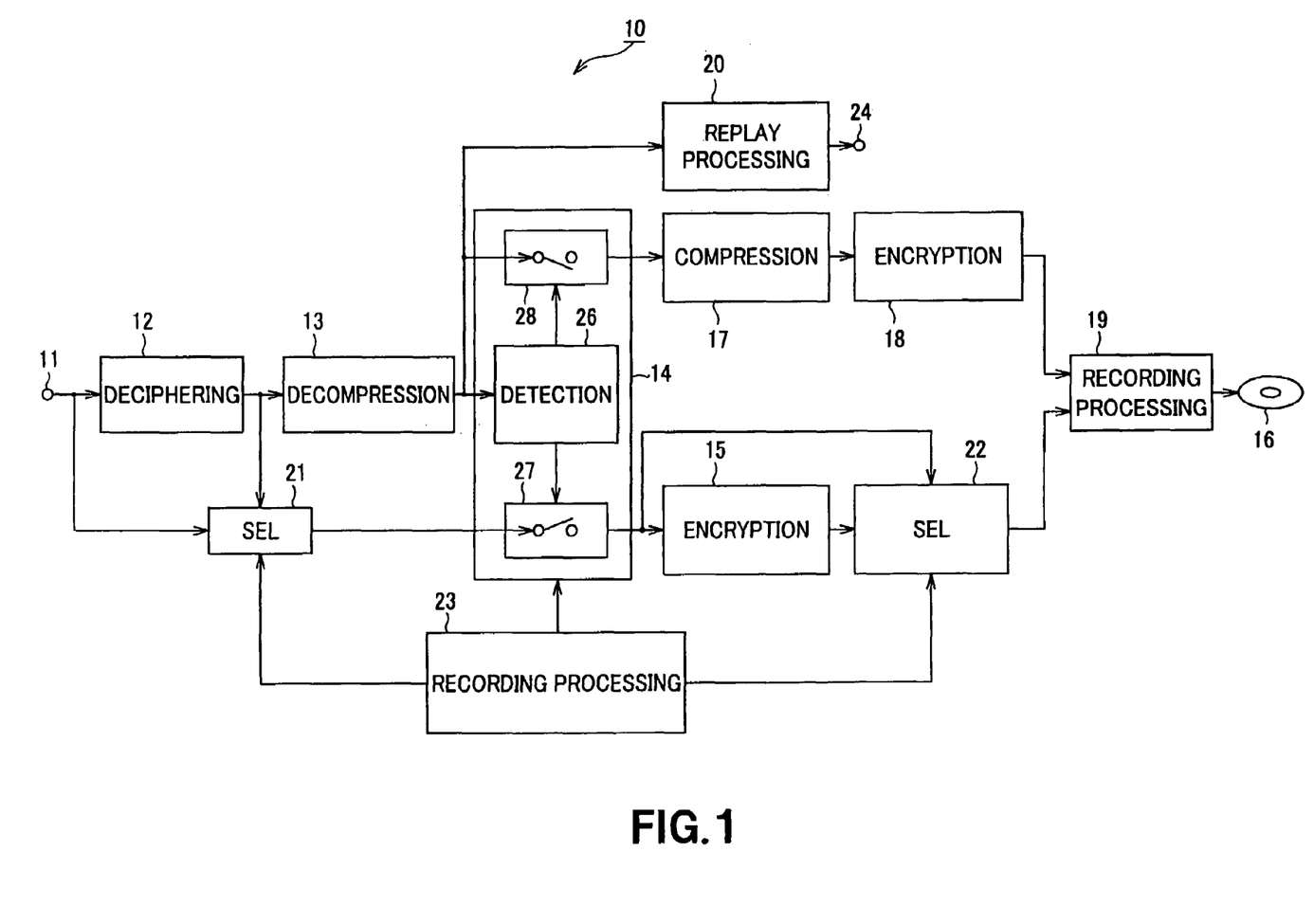
FIG. 1 is a block diagram for illustrating the structure of a data recording device embodying the present invention.
Figure 2:
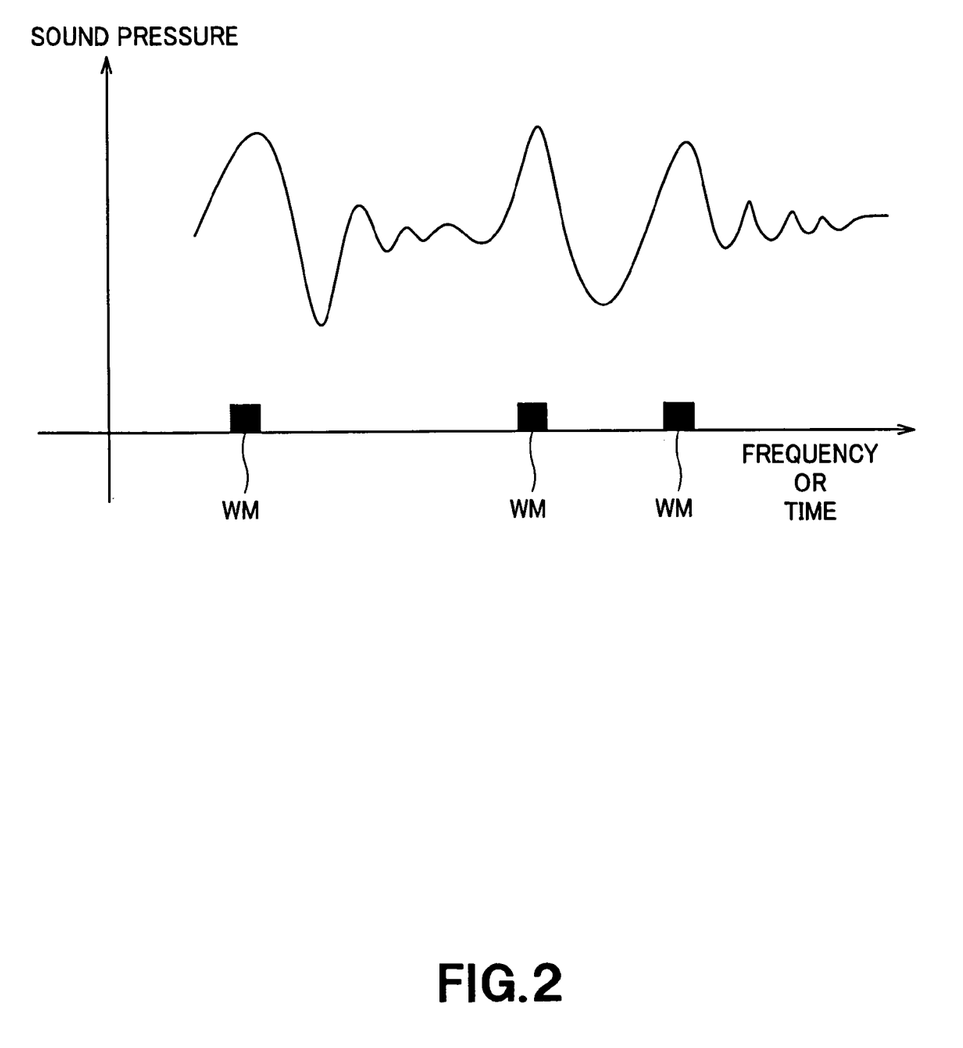
FIG. 2 illustrates watermark signals.

Referring first to FIG. 1, contents data read out from a removable recording medium, such as an optical disc or an IC card, or an enclosed type recording medium, enclosed in a main body unit of a hard disc, or contents data received over a network, such as the Internet, are supplied at an input terminal 11 of a data recording device 10. The contents data, supplied to the input terminal 11, are contents data exemplified by music air data, motion picture data or data of a game software, and are compressed and encrypted. In the contents data, the copyright management data are embedded by watermark signals. These copyright management data are data such as the number of times of possible replay of contents data, number of times of possible copying of contents data, authentication data or copyright owner data, for preventing the contents data from being illicitly copied or distributed. For preventing the copyright management data from being reproduced only on sampling part of the contents data, the watermark signals WM, making up the copyright management data, are recorded in a state of being distributed over the entire contents data, as shown in FIG. 2. Specifically, when the contents data are audio data, such as music air data, the copyright management data are recorded as minute signals in superposition in a critical band on the frequency axis, by taking advantage of an audible limit or the masking effect, or in superposition in a critical band on the frequency axis, by taking advantage of the temporal masking effect. That is, the copyright management data are recorded by being embedded as watermark signals WM in the contents data, in superposition on the contents data so as not to affect contents data, that is, so as not to be perceived by the human hearing system. Alternatively, the copyright management data may be recorded in superposition on the contents data by applying a spread spectrum technique.

Meanwhile, if the contents data are image data, it is sufficient if the copyright management data is embedded as watermark signals in high frequency components or in redundant portions of the image data.

Referring to FIG. 1, the data recording device 10, at the input terminal 11 of which is supplied the compressed and encoded contents data having the copyright management data embedded therein, includes a deciphering circuit 12 for deciphering the contents data, a decompression circuit 13 for decompressing the decoded compressed data from the deciphering circuit 12, a watermark detection circuit 14 for detecting the watermark signals from the decoded decompressed contents data, an encryption circuit 15 for re-encrypting the contents data from the watermark detection circuit 14 for improving the safety in recording the contents data on a recording medium 16, a compression circuit 17 for compressing the contents data for recording the contents data on the recording medium 16 and an encryption circuit 18 for encrypting the contents data compressed by the compression circuit 17. The data recording device also includes a recording processing circuit 19 for performing recording processing on the contents data for recording on the recording medium 16 and a replay processing circuit 20 for reproducing the contents data.

The data recording device 10 further includes a first selector 21 for selectively sending the compressed encrypted contents data from the input terminal 11 and the contents data decoded by the deciphering circuit 12 to the watermark detection circuit 14, a second selector 22 for selectively sending the compressed encrypted contents data from the watermark detection circuit 14 and the re-encrypted contents data from the encryption circuit 15 to the recording processing circuit 19, and a recording controlling circuit 23 for controlling the operation of recording the contents data on the recording medium 16.

The deciphering circuit 12 is supplied with encrypted encoded contents data transmitted to the input terminal 11 from another device, or which is read out from a recording medium, such as an optical disc. The deciphering circuit 12 has stored in an internal memory, not shown, compressed encrypted contents data for deciphering the contents data and, when the compressed encrypted contents data are supplied from the input terminal 11, deciphers the contents data, using cipher key data stored in a memory. The deciphering circuit 12 outputs the decoded compressed data to the decompression circuit 13 and to the first selector 21.

The decompression circuit 13 decompresses the compressed contents data, decoded by the deciphering circuit 12. For example, when the contents data are audio data, the decompression circuit 13 decompresses the contents data, compressed in accordance with compression systems, such as the ATRAC 3 (Adaptive Transform Acoustic Coding 3: trademark), MPEG-2 AAC (Motion Picture Experts Group 2 Advanced Audio Coding), MP3 (MPEG-1 Audio Layer 3), TWIN VQ (Transform-Domain Weighted Interleave Vector Quantization: trademark), MS Audio (WMA: Windows Media Audio: trademark) or Ogg Vorbis (trademark). If the contents data are video data, the decompression circuit 13 decompresses the contents data, compressed in accordance with compression systems, such as MPEG 4 or MPEG 7. The decompression circuit 13 outputs the decompressed contents data to the watermark detection circuit 14.

The watermark detection circuit 14 includes a detection circuit 26 for detecting watermark signals and first and second switching circuits 27, 28 for controlling the outputting of the contents data, supplied in the compressed and encrypted state from the input terminal 11, and the contents data, deciphered in the compressed state by the deciphering circuit 12.

The detection circuit 26 receives the contents data, decoded in the deciphering circuit 12 and decompressed in the decompression circuit 13. From the input contents data, the detection circuit 26 extracts watermark signals from a critical band on the frequency axis or on the time axis and decodes the so extracted watermark signals to generate copyright management data. The detection circuit 26 outputs the copyright management data to the recording controlling circuit 23, while controlling the switching of the first and second switching circuits 27, 28 based on the copyright management data.

Specifically, when the copyright management data, generated from the extracted watermark signals, permit recording of the contents data, the detection circuit 26 changes over the state of one of the first and second switching circuits 27, 28 to an on-state to permit the recording of the contents data on the recording medium 16. Conversely, when the copyright management data, generated from the extracted watermark signals, inhibit recording of the contents data, the detection circuit 26 changes over the states of both the first and second switching circuits 27, 28 to an off-state to inhibit the recording of the contents data on the recording medium 16. When the compressed encoded contents data, supplied from the input terminal 11, is directly recorded on the recording medium 16, or when the compressed contents data decoded by the deciphering circuit 12 is re-encrypted for higher safety, the detection circuit 26 changes over the first switching circuit 27 to an on-state, while changing over the second switching circuit 28 to an off-state. When the contents data decoded by the deciphering circuit 12 and decompressed by the decompression circuit 13 is recorded on the recording medium 16 after re-compression and re-encryption, the detection circuit 26 changes over the first switching circuit 27 to an off-state, while changing over the second switching circuit 28 to an on-state.

When the second switching circuit 28 is off and the first switching circuit 27 is on, the encryption circuit 15 is supplied with compressed contents data deciphered by the deciphering circuit 12. The encryption circuit 15 encrypts compressed data, supplied thereto with cipher key data distinct from the cipher key data of the contents data supplied to e.g. the input terminal 11. The cipher key data is e.g. data based on a serial number etc. of the recording medium 16 on which to record the contents data. The encryption circuit 15 uses cipher key data distinct from the cipher key data used for the contents data supplied to the input terminal 11, or uses a distinct cipher system, to improve the safety of the contents data. The encryption circuit 15 outputs the encrypted contents data via second selector 22 to the recording processing circuit 19.

When the first switching circuit 27 and the second switching circuit 28 are in the off-state and in the on-state, respectively, the compression circuit 17 receives the compressed contents data, deciphered in the deciphering circuit 12, as an input. When the input contents data is the audio data, the compression circuit 17 re-compresses the contents data, decompressed by the decompression circuit 13, in accordance with the aforementioned ATRAC 3, MPEG-2 AAC, MP3, Twin VQ, MS Audio, Ogg Vorbis etc. When the contents data is the video data, the compression circuit 17 re-compresses the contents data, decompressed by the decompression circuit 13, by e.g. MPEG 4 or MPEG 7. The compression circuit 17 outputs the compressed contents data to the encryption circuit 18.

It is noted that the compression circuit 17 may re-compress the contents data by the same compression system as that of the contents data supplied to the input terminal 11, or by a compression system distinct from that for the contents data supplied to the input terminal 11, depending on the sort of the recording medium 16 on which to record the contents data.

The encryption circuit 18 receives contents data compressed by the compression circuit 17. The encryption circuit 18 has stored cipher key data in an internal memory, not shown, and encrypts the input contents data using the cipher key data read out from this memory. The encryption circuit 15 outputs the encrypted contents data to the recording processing circuit 19.

Meanwhile, the encryption circuit 18 may re-encrypt the contents data in accordance with the same encryption system as that used for encrypting the contents data supplied to the input terminal 11. Alternatively, the encryption circuit 18 may re-encrypt the contents data using different cipher key data, or using an encryption system different from that of the contents data supplied to the input terminal 11.

The recording processing circuit 19 is supplied with contents data, supplied at the input terminal 11 via first switching circuit 27 of the watermark detection circuit 14, compressed encrypted contents data, re-encrypted in the compression circuit 17, or with contents data re-compressed by the compression circuit 17 and re-encrypted by the encryption circuit 18, to perform recording processing on the input contents data for recording on the recording medium 16. The recording processing circuit 19 performs error correction and encoding, 8-14 modulation or 8-16 modulation on the contents data to generate recording data for recording on the recording medium 16.

The recording medium 16 is a hard disc, an optical disc of the overwrite or write once type, a magneto-optical disc, a magnetic disc, a magnetic tape or an IC card employing a semiconductor memory as a recording medium, and is either enclosed in a main body unit or removable. On this recording medium 16, recording data are recorded by recording means, such as a magnetic head or an optical pickup, depending on the type of the recording medium.

The replay processing circuit 20 is supplied with contents data which has been routed to the input terminal 11, decoded by the deciphering circuit 12 and which has been decompressed by the decompression circuit 13. The replay processing circuit 20 processes the contents data such as by converting digital signals into analog signals, and outputs the converted data to an output terminal 24. To this output terminal 24 is connected a loudspeaker or a monitor, such that audio data are output via loudspeaker as audible sound or image data are displayed on the monitor.

The first selector 21 is able to is able to selectively route the compressed encrypted contents data from the input terminal 11 and the contents data decoded by the deciphering circuit 12 to the first switching circuit 27 of the watermark detection circuit 14. The second selector 22 is able to selectively output compressed encoded contents data, supplied to the input terminal 11 from the watermark detection circuit 14, or the re-encrypted contents data from the encryption circuit 15, to the recording processing circuit 19.

The recording controlling circuit 23 controls the watermark detection circuit 14, first selector 21 and the second selector 22, responsive to an input from the deciphering circuit 12. Specifically, the recording controlling circuit 23 determines whether the compressed encrypted contents data, supplied from the output terminal 11, is data directly recordable on the recording medium 16, data that needs to be re-encrypted by the encryption circuit 15 or data that needs to be re-compressed or re-encrypted. Based on the copyright management data, generated from e.g. the watermark signals, the recording controlling circuit 23 determines e.g. whether or not the data is to be directly recorded on the recording medium.

When the compressed encoded contents data, supplied from the input terminal 11, is directly recorded on the recording medium, the recording controlling circuit 23 controls the first selector 21 so that the input terminal 11 is connected to the first switching circuit 27 of the watermark detection circuit 14 and so that the compressed encrypted data supplied from the input terminal 11 will be supplied to the first switching circuit 27. On the other hand, the recording controlling circuit 23 controls the second selector 22 to interconnect the first switching circuit 27 and the recording processing circuit 19 so that the compressed encrypted contents data, supplied from the input terminal 11, will be directly supplied to the recording processing circuit 19.

When only deciphering the compressed encrypted contents data, supplied from the input terminal 11, and re-encrypting the contents data for safety for recording on the recording medium 16, the recording controlling circuit 23 controls the first selector 21 to interconnect the deciphering circuit 12 and the first switching circuit 27 to permit the compressed contents data decoded by the deciphering circuit 12 to be supplied to the first switching circuit 27. On the other hand, the recording controlling circuit 23 controls the second selector 22 to interconnect the encryption circuit 15 and the recording processing circuit 19 to permit the compressed contents data encrypted by the encryption circuit 15 to be supplied to the recording processing circuit 19.

The operation of the data recording device 10, constructed as described above, is now explained with reference to FIG. 3. When supplied with the compressed encrypted contents data from the input terminal 11, the data recording device 10 decodes the cipher, using the cipher key data stored in the memory of the deciphering circuit 12, and subsequently decompresses the compressed contents data by the decompression circuit 13. The detection circuit 26, forming the watermark detection circuit 14, is supplied with contents data decoded by the deciphering circuit 12 and decompressed by the decompression circuit 13. From the input contents data, the detection circuit 26 extracts watermark signals from a critical band on the frequency axis or on the time axis and decodes the so extracted watermark signals to generate copyright management data. The detection circuit 26 outputs the copyright management data to the recording controlling circuit 23. In a step S1, the recording controlling circuit 23 is responsive to the copyright management data supplied from the detection circuit 26 and then proceeds to one of steps S2 to S5.

Figure 3:
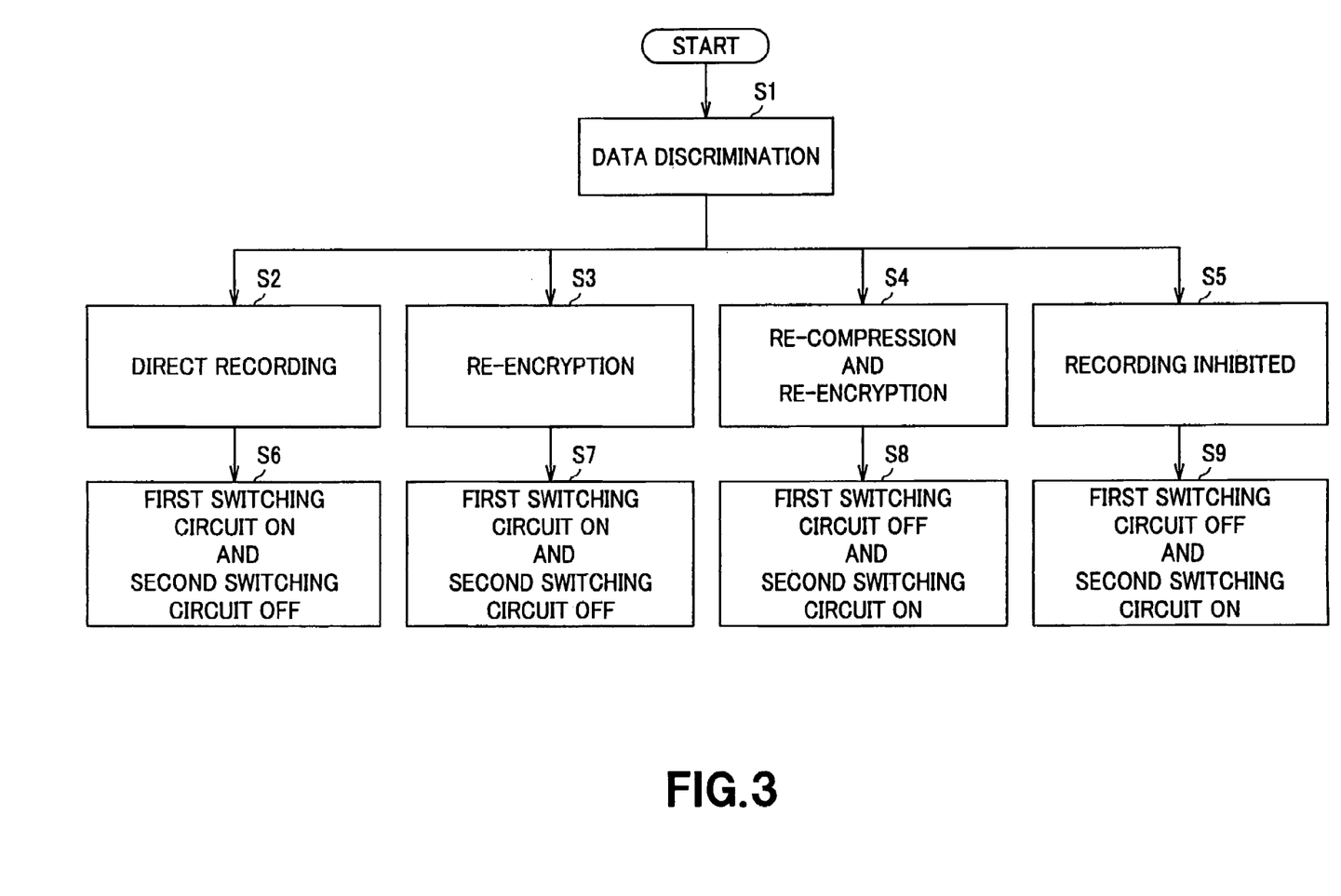
FIG. 3 is a flowchart for illustrating the operation of the data recording device shown in FIG. 1.

The recording controlling circuit 23 in the step S2 executes the following processing if, based on the copyright management data supplied from the detection circuit 26, the recording controlling circuit 23 has determined that the compressed encrypted contents data supplied from the input terminal 11 may directly be recorded on the recording medium 16. That is, the detection circuit 26 in a step S6 changes over the first switching circuit 27 and the second switching circuit 28 to an on-state and to an off-state, respectively. Moreover, the recording controlling circuit 23 changes over the first selector 21 to interconnect the input terminal 11 and the first switching circuit 27 of the watermark detection circuit 14 to permit the compressed encrypted contents data supplied to the input terminal 11 to be supplied to the first switching circuit 27. The recording controlling circuit 23 also changes over the second selector 22 so that the compressed encrypted contents data supplied from the input terminal 11 will be directly supplied to the recording processing circuit 19. By so doing, the compressed encrypted contents data, supplied from the input terminal 11, is supplied to the recording processing circuit 19 via the first switching circuit 27, forming the watermark detection circuit 14, by a route different from the route for detecting the watermark signals, and which is made up by the deciphering circuit 12, decompression circuit 13 and the detection circuit 26. Thus, the contents data is directly recorded on the recording medium 16.

With the method by the step S2, described above, deciphering and decompression are exclusively performed for detecting the watermark signals, while the compressed encrypted contents data, supplied from the input terminal 11, is directly recorded on the recording medium 16. Thus, the input contents data can be efficiently recorded on the recording medium 16. With the method by the step S2, it is possible to prevent data deterioration otherwise caused by irreversible signal conversion of the contents data, because the signal processing comprised of deciphering, decompression and detection of the watermark signals, carried out until the time when the compressed encrypted contents data are recorded on the recording medium, re-compression and re-encryption of the contents data following the detection of the watermark signals and recording of the encrypted compressed contents data on the recording medium, may be eliminated.

Meanwhile, the processing of step S2 may be carried out not only when the copyright management data indicates that the compressed encrypted contents data, supplied from the input terminal 11, is directly recorded on the recording medium 16, but also when the watermark signals could not be extracted by the detection circuit 26. The reason is that, since the recording/reproduction of the contents data is controlled based on the detected watermark signals, the contents data cannot be deciphered and hence cannot be reproduced if the watermark signals could not be detected, so that there is no fear of injuring the benefit of the copyright owner.

If, based on the copyright management data supplied from the detection circuit 26, the recording controlling circuit 23 has determined that the compressed encrypted contents data, supplied from the input terminal 11, needs to be re-encrypted for higher safety, the recording controlling circuit in the step S3 performs the following processing. That is, the detection circuit 26 in a step S7 changes over the first switching circuit 27 and the second switching circuit 28 to an on-state and to an off-state, respectively, whilst the recording controlling circuit 23 changes over the first selector 21 to interconnect the deciphering circuit 12 and the first switching circuit 27 to permit the compressed data decoded by the deciphering circuit 12 to be supplied to the first switching circuit 27. On the other hand, the recording controlling circuit 23 changes over the second selector 22 to interconnect the encryption circuit 15 and the recording processing circuit 19 to permit the compressed contents data encrypted by the encryption circuit 15 to be supplied to the recording processing circuit 19. By so doing, the compressed encrypted contents data, supplied from the input terminal 11, is deciphered using the cipher key data stored in the memory, not shown, in the deciphering circuit 12, and is supplied to the encryption circuit 15 via the first switching circuit 27 forming the watermark detection circuit 14, so as to be re-encrypted using cipher key data different from the cipher key data used for the contents data supplied from the input terminal 11 or in accordance with a different encryption system. The compressed contents data, re-encrypted by the encryption circuit 15, is supplied to the recording processing circuit 19 for recording on the recording medium 16.

With the method by the step S3, in which the deciphering and decompression is performed exclusively for detecting the watermark signals, and the recording on the recording medium is made only after deciphering the compressed encrypted contents data, supplied from the input terminal 11, by the deciphering circuit 12, and re-encrypting the decoded contents data in the encryption circuit 15, the contents data can be efficiently recorded on the recording medium 16. With the method of the step S3, in which the re-encryption in the encryption circuit 15 is executed during the time until the contents data are recorded on the recording medium, it is possible to guarantee the safety of the contents data recorded on the recording medium 16, that is, to prevent deciphering by a third party with a malignant intention. Moreover, with the method by the third step, re-compression of the contents data after detecting the watermark signals following the deciphering and decompression is not performed, and hence it is possible to prevent data deterioration otherwise caused by the irreversible signal conversion.

Moreover, if, based on the copyright management data supplied from the detection circuit 26, the recording controlling circuit 23 has determined that the compressed encrypted contents data, supplied from the input terminal 11, is contents data deciphered by the deciphering circuit 12 and decompressed by the decompression circuit 13 and which further need to be re-compressed and re-encrypted before recording, the recording controlling circuit 23 in a step S4 performs the following processing. That is, the detection circuit 26 in a step S8 changes over the second switching circuit 28 and the first switching circuit 27 to an on-state and an off-state, respectively, so as not to permit the compressed encrypted contents data, supplied from the input terminal 11, or the contents data deciphered by the deciphering circuit 12, to be supplied to the encryption circuit 15 or the recording processing circuit 19 downstream of the first switching circuit 27. By so doing, the compressed encrypted contents data, supplied from the input terminal 11, are decoded in the deciphering circuit 12, using cipher key data stored in the memory, not shown, so as to be then decompressed by the decompression circuit 13. The decompressed contents data are then sent to the detection circuit 26, while being supplied through the second switching circuit 28 to the compression circuit 17. Thus, the contents data sent to the deciphering circuit 12 and the decompression circuit 13 in the step S1 for detecting the watermark signals are sent via switching circuit 28 to the compression circuit 17. The contents data, decompressed by the decompression circuit 13, are re-compressed by the compression circuit 17 and encrypted by the encryption circuit 18 before being processed for recording on the recording medium.

With the method by ths step S4, if the contents data needs to be recorded on the recording medium 16 in a compression encryption scheme different from that used for the data supplied from the input terminal 11, the contents data deciphered by the deciphering circuit 12 and decompressed by the decompression circuit 13 may be re-compressed by the compression circuit 17 in a preset scheme and re-encrypted by the encryption circuit 18, for recording on the recording medium, thus in a compression encryption scheme different from that used when supplying the contents data to the input terminal 11.

If, based on the copyright management data, supplied from the detection circuit 26, the recording controlling circuit 23 has determined that the recording on the recording medium of the compressed encrypted contents data, supplied from the input terminal 11, is inhibited, the recording controlling circuit 23 performs the following processing in the step S5. That is, the detection circuit 26 in a step S9 changes over both the first and second switching circuits 27, 28 to the off-state so as not to permit the compressed encrypted contents data, supplied from the input terminal 11, or the compressed contents data decoded by the deciphering circuit 12, to be routed via the first switching circuit 27 to the recording processing circuit 19 or to the encryption circuit 15, or so as not to permit the decompressed contents data from the decompression circuit 13 to be routed via second switching circuit 28 to the compression circuit 17. That is, in this case, the first and second switching circuits 27, 28 are changed over to the off-state so as not to permit the contents data from the input terminal 11 to be routed to the recording processing circuit 19 for recording on the recording medium 16.

In the method by the step S5, the copyright management data is generated from the watermark signals embedded in the contents data and, if the so generated copyright management data indicates inhibition of recording on the recording medium 16, the first and second switching circuits 27, 28 are both changed over to the off-state to inhibit recording on the recording medium 15 to prevent the benefit of the copyright owner from being jeopardized unlawfully.

For reproducing the compressed encrypted contents data, supplied from the input terminal 11, the compressed encrypted contents data, supplied from the input terminal 11, is decoded by cipher key data stored in the memory, not shown, in the deciphering circuit 12, and is decompressed by the decompression circuit 13, so as to be then routed to the detection circuit 26. From the contents data, supplied from the decompression circuit 13, the detection circuit 26 extracts watermark signals from the critical band on the frequency axis or on the time axis and decodes the so extracted watermark signals to generate the copyright management data. The detection circuit 26 then verifies whether or not the so generated copyright management data permits the reproduction of the contents data. When the copyright management data permits the reproduction of the contents data, the contents data, decoded by the deciphering circuit 12 and decompressed by the decompression circuit 13, is supplied to the replay processing circuit 20 where the data is demodulated and corrected for errors. If the contents data are image data containing audio data, the sound is output from a loudspeaker coupled to the output terminal 24, whilst an image is displayed as an image on a monitor.

With the above-described data recording device 10, the compressed encrypted contents data, supplied from the input terminal 11, are directly recorded on the recording medium 16, as in step S2, or the compressed encrypted contents data, supplied from the input terminal 11, are only re-encrypted for assuring higher safety and are recorded on the recording medium without re-compression, as in the step S3, so that the contents data can be efficiently and promptly recorded on the recording medium. In the present data recording device 10, since at least the irreversible re-compression, such as DCT or quantization, is not executed in the steps S2 or S3, it is possible to prevent sound quality deterioration of the contents data.

Figure 4:
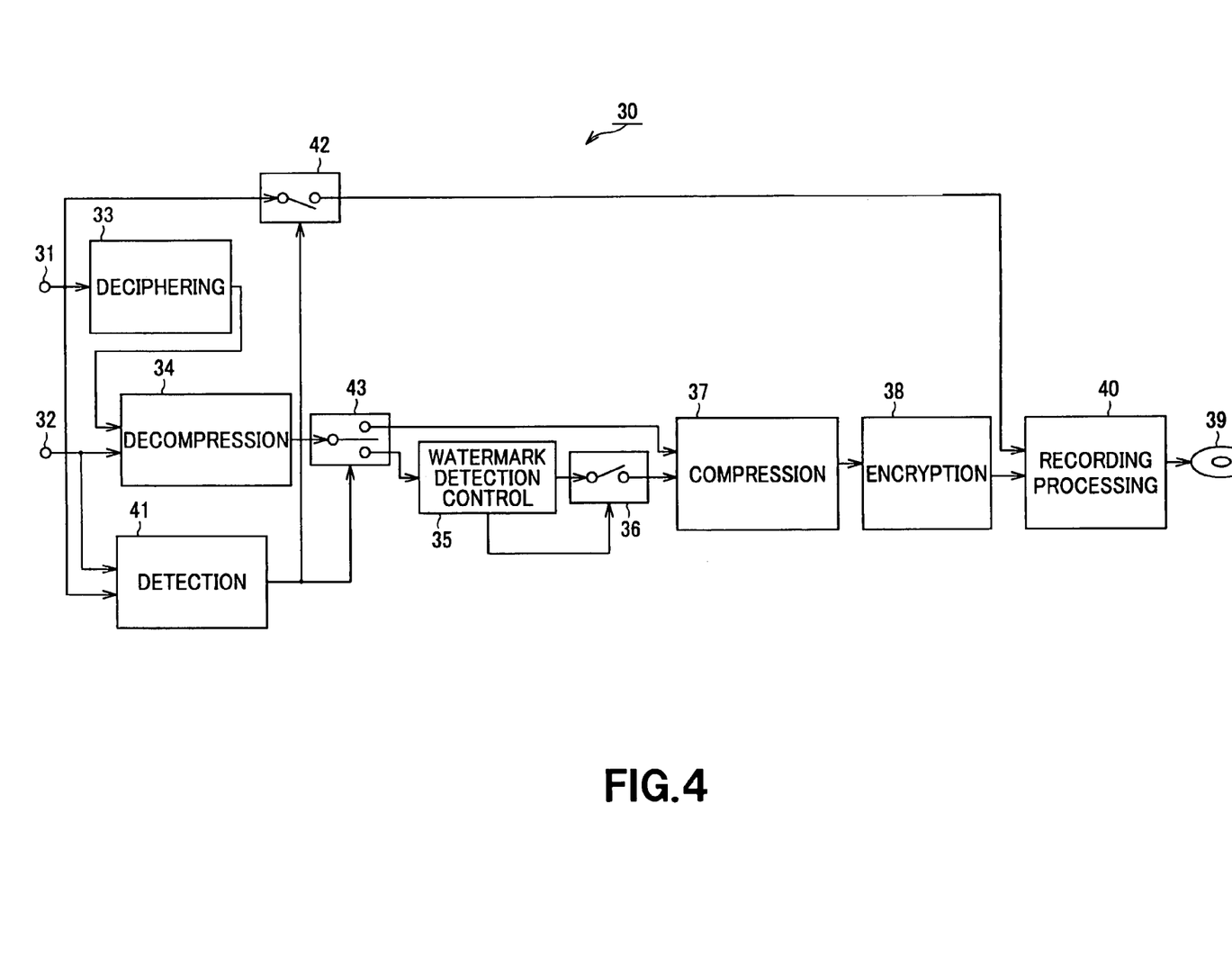
FIG. 4 is a block diagram for illustrating a modification of the data recording device embodying the present invention.

Referring to FIG. 4, another embodiment of the data recording device 10 of the present invention is explained. The data recording device 30 of the present embodiment includes a first input terminal 31 and a second input terminal 32, as input terminals. To the first input terminal 31 are sent contents data read out from a recording medium, such as an optical disc, an IC card or a hard disc, or contents data received over the network, such as Internet. The contents data, supplied to the first input terminal 3, are music number data, motion picture data or game software, and are compressed and encrypted. For example, the contents data are encrypted, using DRM (Digital Rights Management), which supervises the copyright. The main data part of the contents data is encrypted using cipher key data combined with contents ID data issued by an authentication organization. The contents data, copyright-managed by the DRM, includes the contents-based numbers of times of reproduction and contents-based numbers of times of copying.

To the second input terminal 32 are sent non-encrypted, that is plaintext compressed contents data, from a recording medium, such as an optical disc, an IC card or a hard disc, and over a network, such as Internet. In these contents data are embedded copyright management data with watermark signals. Meanwhile, the watermark signals are similar to those sent to the data recording device 10 and hence are not explained specifically.

To the first and second input terminals 31, 32, there may be sent contents data authenticated by the SAC (Secure Authentication Channel) or preset secure contents data.

The data recording device 30, supplied with these contents data, includes a deciphering circuit 33 for deciphering the compressed encrypted contents data, supplied from the input terminal 31, a decompression circuit 34 for decompressing the compressed contents data deciphered by the deciphering circuit 33 or the compressed contents data, supplied from the second input terminal 32, a watermark detection controlling circuit 35 for extracting watermark signals from the contents data decompressed by the decompression circuit 34, a first switching circuit 36 for controlling an output based on the watermark signals extracted by the watermark detection controlling circuit 35, a compression circuit 37 for re-compressing the contents data decompressed by the decompression circuit 34, an encryption circuit 38 for re-encrypting the contents data re-compressed by the compression circuit 37, and a recording processing circuit 40 for executing recording processing on the contents data for recording on a recording medium 39.

The data recording device 30 also includes a detection circuit 41 for detecting whether the contents data supplied from the first input terminal 31 or the second input terminal 32 has been encrypted or authenticated, a second switching circuit 42 for controlling the output of the compressed encrypted contents data, supplied from the first input terminal 31, and a third switching circuit 43 for controlling the output of the contents data decompressed by the decompression circuit 34.

The deciphering circuit 33 is supplied with compressed encrypted contents data, supplied from the first input terminal 31. The deciphering circuit 33 has stored cipher key data in an internal memory, not shown. When supplied with compressed encrypted contents data, supplied from the first input terminal 31, the deciphering circuit 33 deciphers the contents data, using the cipher key data stored in the internal memory, not shown, and e.g. content ID data. The deciphering circuit 33 outputs the deciphered compressed data to the decompression circuit 34.

The decompression circuit 34 decompresses the compressed contents data deciphered by the deciphering circuit 33. For example, if the contents data is audio data, the decompression circuit 34 decompresses the contents data, compressed in accordance with the aforementioned ATRAC 3, MPEG-2 AAC, MP3, Twin VQ, MS Audio, Ogg Vorbis etc. When the contents data is the video data, the decompression circuit 34 decompresses the contents data, compressed by e.g. MPEG 4 or MPEG 7. The decompression circuit 34 outputs the contents data, decoded by the deciphering circuit 33 and decompressed by the decompression circuit 34, to the watermark detection controlling circuit 35 or to the compression circuit 37, via third switching circuit 43.

The watermark detection controlling circuit 35 is supplied with contents data, decoded by the deciphering circuit 33 and decompressed by the decompression circuit 34, via third switching circuit 43. From the input contents data, the watermark detection controlling circuit 35 extracts watermark signals from a critical band on the frequency axis or on the time axis, and decodes the so extracted watermark signals to generate copyright management data. This watermark detection controlling circuit 35 controls the switching of the first switching circuit 36 based on the so generated copyright management data. When the so generated copyright management data permits the recording of the contents data on the recording medium 39, the watermark detection controlling circuit 35 changes over the first switching circuit 36 to an on-state to permit the contents data to be output to the compression circuit 37. When the generated copyright management data inhibits the recording of the contents data on the recording medium 39, the watermark detection controlling circuit 35 changes over the first switching circuit 36 to an off-state to prohibit the contents data from being output to the compression circuit 37.

The compression circuit 37 is supplied with contents data, decompressed by the decompression circuit 34, via the third switching circuit 43, watermark detection controlling circuit 35 or the first switching circuit 36. If the contents data is audio data, the decompression circuit 34 decompresses the contents data, compressed in accordance with the aforementioned ATRAC 3, MPEG-2 AAC, MP3, Twin VQ, MS Audio, Ogg Vorbis etc. When the contents data is the video data, the decompression circuit 34 decompresses the contents data, compressed by e.g. MPEG 4 or MPEG 7. The decompression circuit 34 outputs the compressed contents data to the encryption circuit 38.

Meanwhile, the compression circuit 37 may re-compress the contents data in accordance with the same compression scheme as that for the contents data supplied to the first input terminal 31 or the second input terminal 32, or in accordance with a compression scheme different than that for the contents data supplied to the first input terminal 31 or the second input terminal 32.

The encryption circuit 38 receives contents data compressed by the compression circuit 37. The encryption circuit 38 has stored cipher key data in an internal memory, not shown, and encrypts the input contents data using the cipher key data read out from this memory. The encryption circuit 38 outputs the encrypted contents data to the recording processing circuit 40.

Meanwhile, the encryption circuit 38 may re-encrypt the contents data in accordance with the same encryption scheme as that used for encrypting the contents data supplied to the input terminal 31 or to the second input terminal 32. Alternatively, the encryption circuit 38 may re-encrypt the contents data using an encryption scheme different from that of the contents data supplied to the input terminal 31 or to the second input terminal 32.

To the recording processing circuit 40, there is supplied the contents data, re-compressed by the compression circuit 37 and re-encrypted by the encryption circuit 38. The recording processing circuit 40 executes recording processing on the input contents data for recording on the recording medium 39. The recording processing circuit 40 executes error correction processing, or modulation processing, such as 8-14 modulation or 8-16 modulation, to generate recording data for recording on the recording medium 39. The recording medium 39 is similar to the recording medium 16 used for the data recording device 10 and hence is not explained here specifically. Briefly, recording data, supplied from the recording processing circuit 40, is recorded on the recording medium 39, by recording means, such as magnetic head or optical pickup, depending on the sort of the particular recording medium.

The detection circuit 41 is supplied with contents data from the first input terminal 31 or the second input terminal 32. The detection circuit 41 detects an identifier etc in the input contents data to verify whether the input contents data are encrypted data or authenticated data. When the input contents data are encrypted data or authenticated data, the detection circuit 41 changes over the second switching circuit 42 to an on-state, or changes over the third switching circuit 43 to interconnect the decompression circuit 34 and the compression circuit 37. When the input contents data are not encrypted data or authenticated data, the detection circuit 41 changes over the second switching circuit 42 to an off-state, or changes over the third switching circuit 43 to interconnect the decompression circuit 34 and the watermark detection controlling circuit 35.

Figure 5:
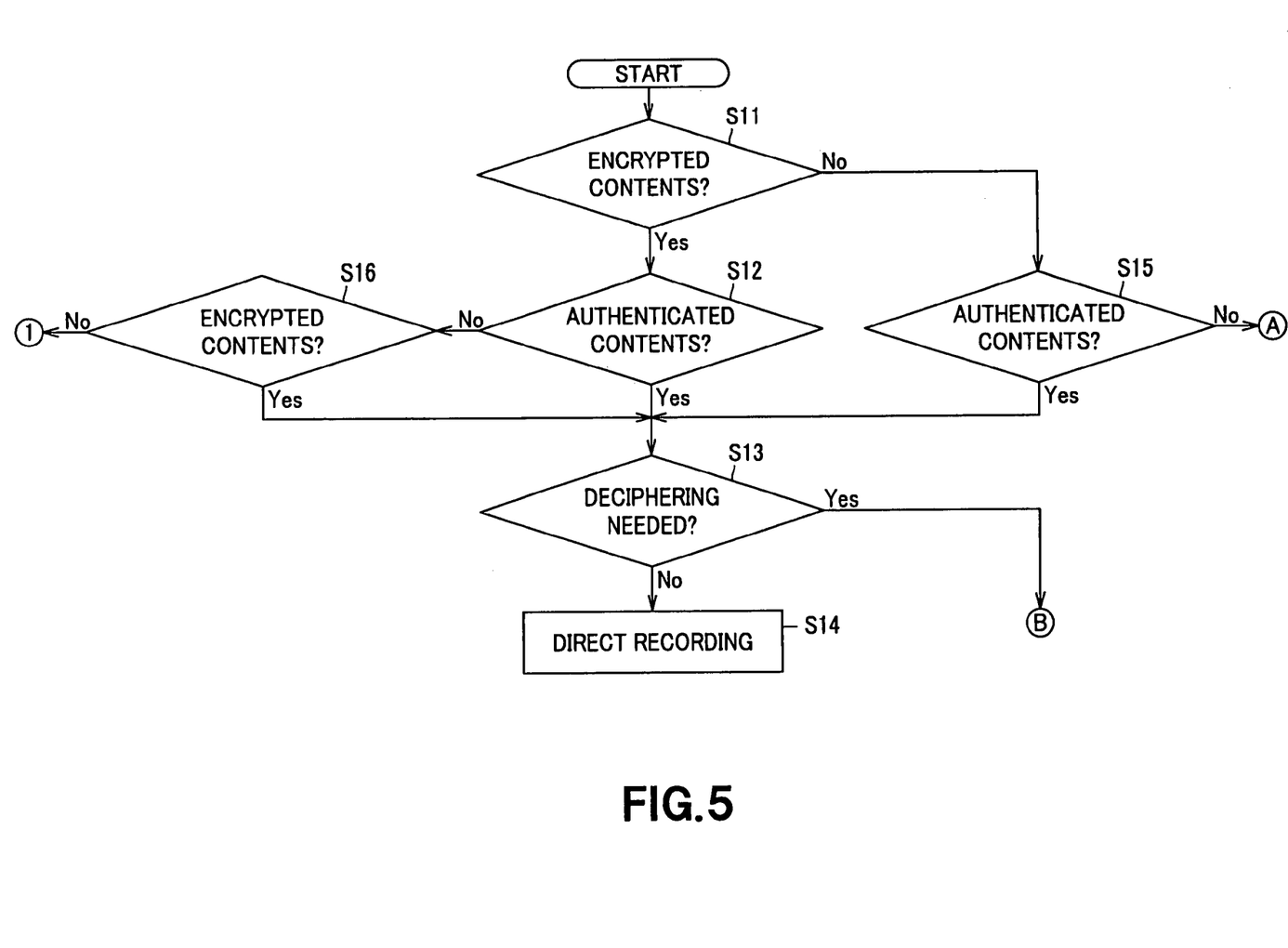
FIG. 5 is a flowchart for illustrating the operation of a data recording device shown in FIG. 4.

Referring to FIG. 5, the operation of the data recording device 30, constructed as described above, is explained. The contents data, supplied from the first input terminal 31 or the second input terminal 32, is sent to the detection circuit 41. In a step S11, the data recording device 30 detects an identifier from the input contents data and, based on the so detected identifier, verifies whether or not the input contents data are encrypted data. If, based on the identifier contained in the contents data, the data recording device 30 has verified that the input contents data has been encrypted, the data recording device proceeds to a step S12 and, if otherwise, the data recording device proceeds to a step S15.

When the data recording device 30 has verified that the input contents data has been encrypted, the data recording device in the step S12 detects the identifier contained in the input contents data, by the detection circuit 41, to verify whether or not the input contents data are authenticated data. That is, the detection circuit 41 refers to the identifier contained in the contents data to verify whether the contents data are contents data transmitted from a device of an authorized user or contents data read out from an authentic recording medium. If, based on the identifier contained in the contents data, the data recording device 30 has verified that the input contents data are authenticated data, the data recording device proceeds to a step S13 and, if otherwise, the data recording device proceeds to a step S16.

The data recording device 30 in the step S13 detects an identifier of the input contents data by the detection circuit 41 and, based on this identifier, verifies whether or not the input contents data is data that needs to be deciphered. When the data recording device 30 has determined that the input contents data do not have to be decoded, the data recording device proceeds to a step S14 and, if otherwise, the data recording device proceeds to a step S17.

In the step S14, the data recording device 30 directly records the compressed encrypted contents data, supplied from the first input terminal 31, on the recording medium 39. That is, the detection circuit 41 changes over the second switching circuit 42 to an on-state, while changing over the third switching circuit 43 to an off-state, that is, to a state in which data is not output to the watermark detection controlling circuit 35 nor to the compression circuit 37. By so doing, the compressed encrypted contents data, supplied from the first input terminal 31, are supplied via second switching circuit 42 to the recording processing circuit 40, and are recorded on the recording medium 39, after the recording processing in the recording processing circuit 40.

When it is determined in the step S11 that the input contents data are unencrypted data, the data recording device 30 in the step S15 detects the identifier contained in the input contents data, by the detection circuit 41, in order to verify whether or not the input contents data are authenticated data. If, based on the identifier contained in the input contents data, the data recording device 30 has determined that the input contents data are authenticated data, the data recording device proceeds to the step S15 and, if otherwise, to a step S23.

If, in the step S12, the data recording device 30 has determined that the input contents data are unauthenticated data, the data recording device in the step S16 detects the identifier contained in the input contents data, and verifies whether or not the input contents data are encrypted data. If, based on the identifier contained in the input contents data, the data recording device 30 has determined that the input contents data are encrypted data, the data recording device proceeds to the step S13 and, if otherwise, to a step S23.

With the method of the steps S11 to S16, since the compressed encrypted contents data, supplied from the first input terminal 31 or the second input terminal 32, is directly recorded on the recording medium 39, the contents data can be efficiently recorded on the recording medium 39. Moreover, with the present method, signal processing consisting in re-compressing and re-encrypting contents data and recording the encrypted and compressed contents data on the recording medium before the time of recording the encrypted compressed contents data on the recording medium 39, is not executed, it is possible to prevent data deterioration otherwise caused by irreversible signal conversion.

If it is determined in the step S13 that the contents data supplied from the first input terminal 31 need to be deciphered, the data recording device 30 in the step S17 deciphers the contents data, supplied in the compressed encrypted state to the deciphering circuit 33, using contents ID data contained in the contents data and the cipher key data stored in the memory, not shown.

Following the deciphering of the contents data, the data recording device 30 in a step S18 detects the identifier contained in the contents data and, based on the detected identifier, verifies whether or not the input contents data is compressed data. If, based on the identifier, contained in the contents data, the data recording device 30 has determined that the input contents data is compressed data, the data recording device proceeds to a step S19 and, if otherwise, to a step S20.

In the step S19, the data recording device 30 decompresses the compressed contents data, deciphered in the deciphering circuit 33. The contents data supplied to the decompression circuit 34 are secure data since these data are confirmed to be encrypted data in the steps S11 and S16, and are also confirmed to be authenticated data in the steps S12 and S15. Consequently, there is no necessity to detect watermark signals from the contents data to decode the copyright management data. Thus, the detection circuit 41 changes over the second switching circuit 42 to an off-state, while also changing over the third switching circuit 43 to interconnect the decompression circuit 34 and the compression circuit 37. The decompression circuit 34 outputs the decompressed contents data through the third switching circuit 43 to the compression circuit 37.

In the step S20, the compression circuit 37 re-compresses the contents data, decompressed by the decompression circuit 34, in accordance with the compression scheme which is the same as or different from that for the input contents data, to output the re-compressed contents data to the encryption circuit 38. In the step S21, the encryption circuit 38 re-encrypts the contents data, compressed by the compression circuit 37, in an encryption scheme which is the same as or different from the encryption scheme for the input contents data. The contents data, encrypted by the encryption circuit 38, are supplied in a step S22 to the recording processing circuit 40 where the data is processed for recording and recorded on the recording medium 39.

In the method from the step S17 to S22, described above, if recording is to be made in accordance with a scheme different from the compression or encryption scheme for contents data supplied from the first input terminal 31, the contents data deciphered in the deciphering circuit 33 and decompressed in the decompression circuit 34 may be re-compressed by the compression circuit 37 in accordance with a preset scheme and re-encrypted in the encryption circuit 38 in accordance with a preset scheme, that is in accordance with a compression or encryption scheme different from that used in supplying the data to the first input terminal 31, for recording the contents data on the recording medium 39.

If, in the steps S11, S15 and S16, the contents data are found to be unencrypted, while not being confirmed to be authenticated, the data recording device 30 in a step S23 detects the identifier from the input contents data and, based on this identifier, verifies whether or not the input contents data has been compressed. When the data recording device 30 has determined that the input contents data is in a compressed state, the data recording device proceeds to a step S24 and, if otherwise, to a step S25.

In a step S24, the decompression circuit 34, on receipt of the contents data in a compressed state, decompresses the input data.

Meanwhile, if the contents data are found to be unencrypted, while not being confirmed to be authenticated, in the steps S11, S15 and S16, the data may be unencrypted plaintext data recorded on a recording medium, such as data recorded on a compact disc, authentic data such as data sent by an authentic user without authentication. However, the data may also be data on a recording medium manufactured by e.g., copying without prior consent and unlawfully distributed, or unlawful data, such as data transmitted from a transmission device of an illicit user. That is, the contents data not encrypted or the authentication of which cannot be ascertained is likely to be data indefinite in origin and likely to jeopardize the benefit of the copyright owner. Thus, if the contents data are found to be unencrypted, while not being confirmed to be authenticated, in the steps S11, S15 and S16, the data recording device 30 according to the present invention extracts watermark signals from the contents data to refer to the copyright management data.

That is, the data recording device 30 in the step S25 changes over the second switching circuit 42 to an off-state, while connecting the third switching circuit 43 to the decompression circuit 34 and to the watermark detection controlling circuit 35, under control by the detection circuit 41. In a step S26, the watermark detection controlling circuit 35 extracts the watermark signals from the contents data supplied from the decompression circuit 34 through the third switching circuit 43 to generate copyright management data. If, in the step S26, the watermark detection controlling circuit 35 has verified that the copyright management data generated permits recording on the recording medium 39, the data recording device 30 changes over the first switching circuit 36 to an on-state to interconnect the watermark detection controlling circuit 35 and the compression circuit 37. The data recording device 30 then proceeds to the step S20. It is also possible for the data recording device 30 to proceed to the step S20 to record the contents data on the recording medium 39 if the watermark detection controlling circuit 35 has found that no watermark signals have been embedded in the contents data or if the watermark detection controlling circuit 35 has failed to decipher the contents data. The contents data output from the watermark detection controlling circuit 35 is re-compressed by the compression circuit 37 and re-encrypted by the encryption circuit 38 in the steps S20 to S22 before being recorded on the recording medium.

When the watermark detection controlling circuit 35 has verified that the copyright management data generated inhibits the recording on the recording medium 39, the watermark detection controlling circuit in a step S27 changes over the first switching circuit 36 to an off-state to prohibit the contents data from the watermark detection controlling circuit 35 from being supplied to the compression circuit 37. That is, the data recording device 30 turns the first switching circuit 36 and the second switching circuit 42 off to inhibit the recording of the contents data on the recording medium 39.

In the above-described data recording device 30, it is verified in the steps S11, S15 and S16 that the contents data supplied is encrypted data and/or authenticated data. If it is found that the input contents data is the encrypted and/or authenticated contents data, that is secure contents data, the contents data supplied to the first input terminal 31 is directly recorded on the recording medium 39, so that the contents data can be recorded on the recording medium 39 efficiently, that is promptly. Moreover, in the present data recording device 30, at least the irreversible re-compression processing, such as DCT or quantization, is not carried out when the compressed encrypted contents data is directly recorded on the recording medium 39, so that it is possible to prevent signal deterioration of the contents data.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

According to the present invention, as described above, if the contents data, supplied from input means, are secure, these secure contents data are directly recorded on the recording medium without performing deciphering or compression/decompression processing for detecting watermark signals, whereby the contents data can be recorded efficiency on the recording medium without incurring data deterioration.

The invention claimed is:

1. A data recording device comprising:
    a deciphering processing unit configured to decipher and/or decompress input encrypted and/or compressed data by way of deciphering processing;
    a detection unit configured to detect whether or not watermark signals are included in said input encrypted and/or compressed data without decryption and/or decompression processing;
    a data processing unit supplied at least with data from said deciphering processing for applying signal processing for recording to the supplied data;
    a recording unit configured to record output data from said processing unit on a recording medium; and
    a controller configured to control the recording, when said detection unit detects that said watermark signals are included, based on the detected watermark signals wherein, detection of watermark signals indicate that the input encrypted and/or compressed data is to be directly recorded on said recording medium without a decryption or decompression processing, and said controller changes over said data processing unit in a controlled manner to supply the input encrypted and/or compressed data directly to said recording processing unit.

2. The data recording device according to claim 1 wherein, if the detected watermark signals inhibit the recording on said recording medium, said controller exercises control for changing over said data processing unit so as not to permit data from said data processing unit to be supplied to said controller.

3. The data recording device according to claim 2 wherein said data processing unit includes a switching circuit configured to change over an output from said data processing unit and wherein said controller changes over said switching circuit.

4. The data recording device according to claim 2 wherein data processing unit includes a recording processing unit configured to apply at least modulation processing and error correction processing for recording to said input encrypted and/or compressed data and wherein said controller changes over said data processing unit in a controlled manner to send the input encrypted and/or compressed data to said recording processing unit when watermark signals cannot be detected from said input encrypted and/or compressed data.

5. The data recording device according to claim 4 wherein said data processing unit includes a switching circuit configured to change over the output of said data processing unit and wherein said controller changes over said switching circuit in a controlled manner based on the detected watermark signals.

6. The data recording device according to claim 5 wherein said controller changes over said switching circuit to send data from said deciphering processing unit to said recording processing unit.

7. The data recording device according to claim 1 wherein, if the watermark signals detected permit recording on said recording medium, said controller sends output data from said data processing unit to said recording unit.

8. The data recording device according to claim 1 wherein said data processing unit includes a switching circuit configured to change over the output from said data processing unit and wherein said controller changes over said switching circuit based on the detected watermark signals.

9. The data recording device according to claim 1 wherein said data processing unit includes a re-encryption processing unit supplied with data from said deciphering processing unit to re-encrypt the data supplied and wherein said controller changes over said data processing unit in a controlled manner for supplying the data from the deciphering processing unit to said re-encryption processing unit based on the detected watermark signals.

10. The data recording device according to claim 9 wherein said data processing unit includes a switching circuit configured to change over an output of said deciphering processing unit and wherein said controller controls said switching circuit based on the detected watermark signals.

11. The data recording device according to claim 10 wherein said controller changes over said switching circuit to supply data from said deciphering processing unit to said re-encryption processing unit.

12. The data recording device according to claim 1 wherein said data processing unit includes a re-compression processing unit configured to re-compress data supplied from said deciphering processing unit and a re-encryption processing unit configured to re-encrypt data supplied from said re-compression processing unit, and wherein said controller changes over said data processing unit to send the data from said deciphering processing unit to said re-compression processing unit.

13. The data recording device according to claim 12 wherein said data processing unit includes a switching circuit configured to change over the output from the data processing unit and wherein said controller changed over said switching circuit in a controlled manner based on the detected watermark signals.

14. The data recording device according to claim 13 wherein said controller changes over said switching circuit to permit data from said deciphering processing unit to be supplied to said re-compression processing unit.

15. The data recording device according to claim 1 wherein said data processing unit includes a recording processing unit configured to apply at least modulation processing and error correction processing to the input encrypted and/or compressed data.

16. The data recording device according to claim 15 wherein said data processing unit includes a switching circuit configured to change over an output of said data processing unit and wherein said controller changes over said switching circuit in a controlled manner based on said detected watermark signals.

17. The data recording device according to claim 16 wherein said controller changes over said switching circuit to permit data from said deciphering processing unit to be supplied to said recording processing unit.

18. The data recording device according to claim 1 further comprising:
a decision unit configured to discriminate whether or not the input encrypted and/or compressed data is encrypted data, and a switching circuit changed over by said decision unit, wherein, if said decision unit has verified that the input encrypted and/or compressed data is encrypted data, said switching circuit is changed over to permit data from said deciphering processing unit to be supplied to said data processing unit.

19. The data recording device according to claim 18 wherein, if said decision unit has verified that the input encrypted and/or compressed data is the unencrypted data, said switching circuit is changed over to permit data from said deciphering processing unit to be supplied to said detection unit.

20. The data recording device according to claim 19 wherein said data processing unit includes a recording processing unit configured to apply at least modulation processing and error correction processing for recording to said input encrypted and/or compressed data, wherein the data recording device further includes a further switching circuit changed over by said decision unit, the input encrypted and/or compressed data is supplied via said further switching circuit to said recording processing unit, and wherein, if said decision unit has verified that the input encrypted and/or compressed data are unencrypted data, said further switching circuit is changed over so as not to permit the input encrypted and/or compressed data to be supplied to said recording processing unit.

21. A data recording method comprising:
deciphering and/or decompressing input encrypted and/or compressed data by way of deciphering processing;
detecting whether or not watermark signals are included in said input encrypted and/or compressed data without decryption and/or decompression processing;
changing over the processing operation of recording the input encrypted and/or compressed data on a recording medium, based on said watermark signals, when such watermark signals have been detected; and
directly recording the input encrypted and/or compressed data to the recording medium without a decryption or decompression processing upon detecting that said watermark signals are included in said input encrypted and/or compressed data.

22. The data recording method according to claim 21 wherein, if the detected watermark signals inhibit the recording on said recording medium, the recording of said deciphered data on said recording medium is inhibited.

23. The data recording method according to claim 21 wherein, if the watermark signals detected permit recording on said recording medium, a processing operation for recording is performed on the deciphered data and the data processed for recording are recorded on said recording medium.

24. The data recording method according to claim 21 wherein, if re-encryption is needed based on the detected watermark signals, the deciphered data are re-encrypted and subsequently recorded on said recording medium.

25. The data recording method according to claim 21 wherein, if re-compression is needed based on the detected watermark signals, the deciphered data are re-compressed and subsequently recorded on said recording medium.

26. The data recording method according to claim 25 wherein said re-compressed data is re-encrypted and subsequently recorded on said recording medium.

27. The data recording method according to claim 21 wherein, if no watermark signals have been detected from said input encrypted and/or compressed data, the input encrypted and/or compressed data are directly recorded on said recording medium.

28. The data recording method according to claim 21 wherein it is determined whether or not the input encrypted and/or compressed data are encrypted data and, if the input encrypted and/or compressed data are determined to be encrypted data, said processing for recording is performed on said deciphered data.

29. The data recording method according to claim 28 wherein, if the input encrypted and/or compressed data are determined to be unencrypted data, it is detected whether or not said watermark signals are contained in said input encrypted and/or compressed data.

30. A computer readable storage medium encoded with computer program instructions which cause a processor to implement a method of data recording, comprising:

detecting whether or not watermark signals are included in said input encrypted and/or compressed data without decryption and/or decompression processing;

changing over the processing operation of recording the input encrypted and/or compressed data on a recording medium, based on said watermark signals, when such watermark signals have been detected; and directly recording the input encrypted and/or compressed data to the recording medium without a decryption or decompression processing upon detecting that said watermark signals are included in said input encrypted and/or compressed data.

* * * * *